(12) United States Patent
Zheng

(10) Patent No.: US 12,324,059 B2
(45) Date of Patent: *Jun. 3, 2025

(54) INTELLIGENTLY MANAGING AUTOMATIC PERFORMANCE OF DISTRIBUTED TESTS

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,961

(22) Filed: Aug. 4, 2023

(65) Prior Publication Data

US 2023/0380012 A1    Nov. 23, 2023

Related U.S. Application Data

(63) Continuation of application No. 17/170,358, filed on Feb. 8, 2021, now Pat. No. 11,765,789.

(51) Int. Cl.
| | |
|---|---|
| *H04W 84/02* | (2009.01) |
| *G06F 9/30* | (2018.01) |
| *G06F 9/38* | (2018.01) |
| *G06F 18/214* | (2023.01) |
| *G06N 20/00* | (2019.01) |

(52) U.S. Cl.
CPC ........ *H04W 84/02* (2013.01); *G06F 9/30123* (2013.01); *G06F 9/3836* (2013.01); *G06F 18/214* (2023.01); *G06N 20/00* (2019.01)

(58) Field of Classification Search
CPC .. H04W 84/02; G06F 9/30123; G06F 9/3836; G06F 18/214; G06F 18/24; G06F 18/254; G06N 20/00; G06N 3/0464; G06N 5/01; G06N 20/20
USPC ........................................................ 370/329
See application file for complete search history.

(56) References Cited

U.S. PATENT DOCUMENTS

| | | | |
|---|---|---|---|
| 10,779,178 B1 * | 9/2020 | Ramanathan | H04W 8/04 |
| 2016/0341564 A1 * | 11/2016 | Cheng | G01C 21/3641 |
| 2020/0234185 A1 * | 7/2020 | Rugel | G06F 11/321 |
| 2022/0167236 A1 * | 5/2022 | Melodia | H04W 28/24 |

* cited by examiner

*Primary Examiner* — Kwang B Yao
*Assistant Examiner* — Syed M Bokhari
(74) *Attorney, Agent, or Firm* — Foley IP Law, PLLC

(57) ABSTRACT

The disclosure herein describes intelligently managing distribution of tests to user devices. Test definition data of a target test is obtained by a processor of a testing platform. A set of user devices is identified for executing the target test from a plurality of available user devices. Identifying the set of user devices includes, for each user device, analyzing device configuration data and predicted usage context data using test requirements of the test definition data, identifying a likelihood that the user device will enter a required device state during a test interval of the target test, and determining an average likelihood data value for the set of user devices satisfies the test requirements. Test execution control signals are sent to each user device of the set of user devices and test results associated with execution of the target test are received from the set of user devices.

20 Claims, 6 Drawing Sheets

INTELLIGENTLY MANAGING AUTOMATIC PERFORMANCE OF DISTRIBUTED TESTS

CROSS-REFERENCE TO RELATED APPLICATION

This application is a continuation application of and claims priority to U.S. patent application Ser. No. 17/170,358, entitled "INTELLIGENTLY MANAGING AUTOMATIC PERFORMANCE OF DISTRIBUTED TESTS," filed on Feb. 8, 2021, the disclosure of which is incorporated herein by reference in its entirety.

BACKGROUND

Running user trials is critical for the development of new technologies, such as fifth generation (5G) cellular network technology. Such trials enable the collection of real user feedback with associated technical details. However, current approaches have major drawbacks, including that tests run by the users must be specifically defined and, in many cases, performance of the tests requires some degree of interaction by the user, which may make it more difficult to convince users to participate. These issues make it challenging for developers to obtain necessary test data in a timely manner.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Aspects of the disclosure enhance test performance by intelligently managing distribution of tests to user devices at least by obtaining, by a processor of a testing platform, device data from a user device via a network connection, wherein the device data includes device configuration data and device usage data (which is obtained with user's consent when they join the user trial program); generating, by the processor, a usage prediction model associated with the user device based on the obtained device usage data; determining, by the processor, predicted usage context data of the user device based on the generated usage prediction model; identifying, by the processor, a test that is scheduled to be performed using distributed testing, wherein the test includes test requirements that are satisfied by the device configuration data and the predicted usage context data of the user device; based on identifying the test, sending, by the processor, test instructions associated with the identified test to the user device, wherein the test instructions are configured to cause the user device to automatically execute the identified test; and receiving, by the processor, a test result associated with execution of the identified test from the user device.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
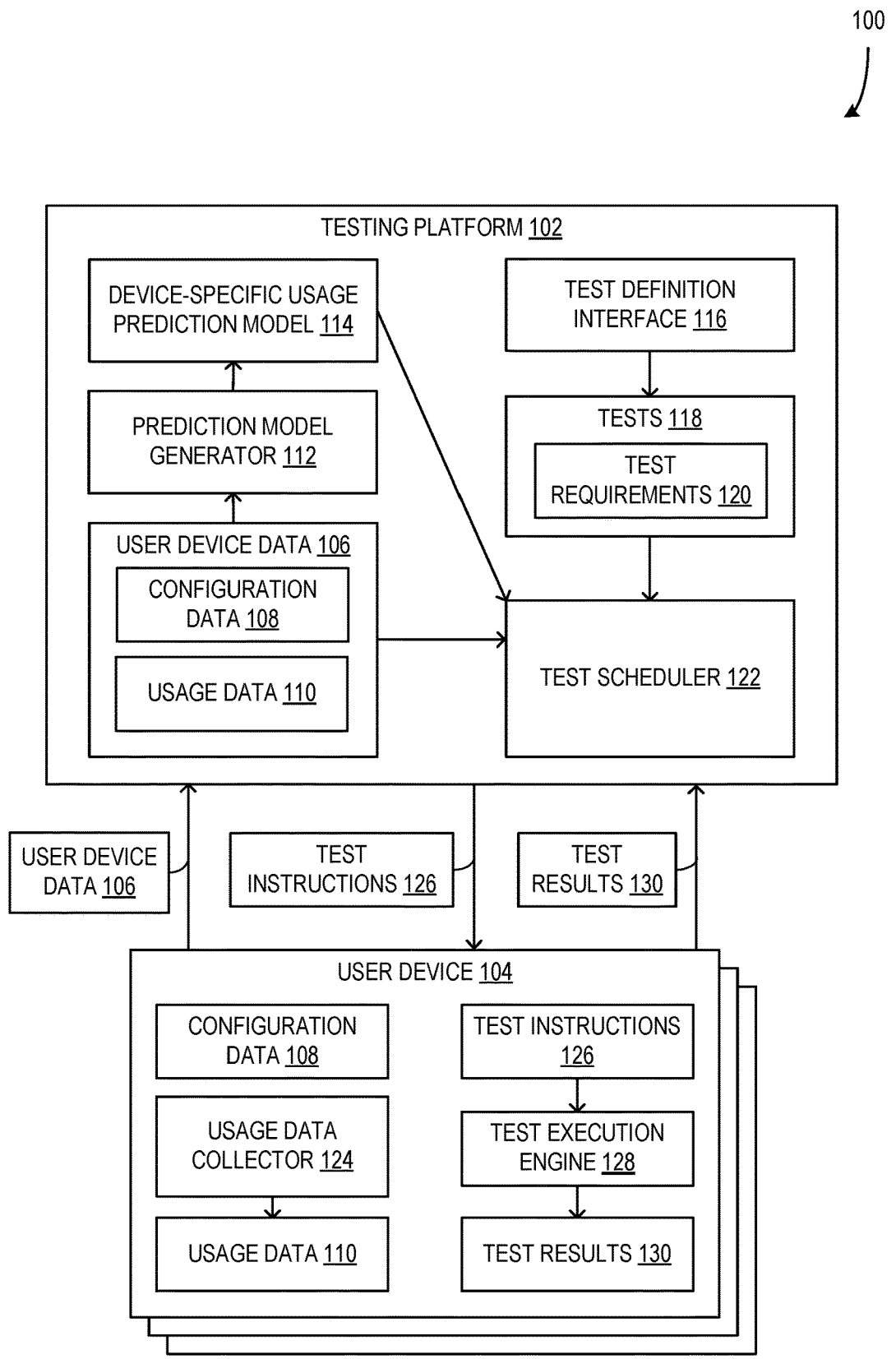
FIG. 1 is a block diagram illustrating a system for intelligently managing distributed testing according to an embodiment.

Systems and methods for intelligently managing and distributing tests to multiple user devices for automatic performance thereon are described. The testing platform enables tests for testing very specific use cases to be defined and identifies sets of user devices that are the most likely to satisfy the requirements of those tests. The testing platform is configured to collect configuration data from the user devices and use that data to match pending tests to those user devices, but it also collects usage data of the user devices, which it uses to predict future behavior of those devices. The predicted future behavior, or predicted usage context data, of the user devices is also used to match pending tests to the user devices most likely to automatically perform the tests or at least to satisfy the requirements of the tests. For instance, a test may require that the testing user device have a specific software configuration and transition from a Wi-Fi based network connection to a cellular network connection. The collected usage data of available user devices is analyzed and user devices with the matching software configuration and that are most likely to perform the required network connection transition are identified. Those identified user devices may receive test instructions for performing the test upon detecting the required network connection transition.

The described systems and methods enable the use of device-specific usage prediction models to target the distribution of tests to user devices efficiently. Device data is obtained from user devices, including configuration data and usage data, and the usage data is used to generate usage prediction models. The usage prediction models, which can be built on the device, or in the cloud, depending on the computation requirement of the models, are used to determine predicted usage context data of the user devices and that data, in combination with the configuration data, is analyzed with respect to test requirements of pending tests. Tests with requirements that are satisfied by the data of user devices are identified and test instructions are sent to those user devices. The test instructions are configured to cause the user devise to automatically perform the tests. Based on those tests being performed, test results are received from the user devices.

Further, the described systems and methods enable the intelligent distribution of pending tests to a set of user devices that meet device quantity requirements of the tests. Test definition data of a target test from a plurality of pending tests is obtained and a set of user devices for executing the target test is identified. Identifying the set of user devices includes analyzing device configuration data and predicted usage context data based on test requirements and, if the test requirements are satisfied, adding the analyzed user device to the set of devices to be used in testing. When the set of user devices to be used with the test reaches a quantity of user devices that satisfies a device quantity requirement of the test, test instructions are sent to the set of user devices and later, associated test result are received from the set of user devices.

The described systems and methods provide intelligent, cloud-based test management that operates in an unconventional manner by leveraging predicted user device behavior to distribute and automatically perform tests on user devices with minimal or no required interaction from the users of the user devices. Predicted usage models that are specific to each user device are also dynamically updated and trained using up-to-date usage data obtained from the user devices, enhancing the accuracy and efficiency with which the tests are distributed. The predicted behavior of the user devices is further leveraged to precisely tune the quantity of user devices that are engaged to perform each test, enabling the system to ensure that sufficient test results are gathered and also to avoid sending test instructions to excess user devices, which may be a waste of associated network and/or processing resources. The described systems and methods enable developers to craft focused, use case-specific tests and obtain associated test results quickly and efficiently, reducing or preventing delays to further development that may be caused by waiting on test results. Additionally, those test results may further be used to train, tune, and/or update the operations of the described testing platform, enabling the performance of the platform to be improved dynamically. Generally, the disclosure enables developers to organize and perform tests of specific use cases at given locations, at given times, and/or associated with particular device configurations and/or behavior in a timely manner.

FIG. 1 is a block diagram illustrating a system 100 for intelligently managing distributed testing according to an embodiment. The system 100 includes a testing platform 102 and a plurality of user devices 104. In some examples, the testing platform 102 is configured to manage the performance of tests 118 by user devices 104 based on collected user device data 106, such that the test requirements 120 of tests 118 are satisfied by the user devices 104 upon which the tests 118 are executed.

In some examples, the testing platform 102 includes hardware, firmware, and/or software configured to receive or otherwise obtain user device data 106, including configuration data 108 and usage data 110, from the user devices 104 of the system 100. The testing platform 102 is further configured to use the usage data 110 received from the user devices 104 with a prediction model generator 112 to generate device-specific usage prediction models 114 for each of the user devices 104. The testing platform 102 is configured to use the generated usage prediction models 114 and associated configuration data 108 by a test scheduler 122 to determine which user devices 104 are likely to satisfy test requirements 120 of tests 118. Those tests 118 may be scheduled for performance by the determined user devices 104 by a test scheduler 122 of the testing platform 102 and, as a result of the scheduling, the testing platform 102 is configured to send test instructions 126 to the determined user devices 104. Further, the testing platform 102 is configured to receive test results 130 associated with scheduled tests 118 from user devices 104 that have been instructed to perform such tests. Those test results 130 may be stored by or in association with the testing platform 102 and/or provided for use or consumption by other entities in communication with the testing platform 102 (e.g., test results 130 may be stored in a test result data store associated with the testing platform 102 and may be accessed by users of the system 100, such as users that generated the associated tests 118).

In some examples, the testing platform 102 is located on and/or executed by a computing device (e.g., a server device, a personal computer, a laptop, a tablet computing device, a mobile phone, etc.). Alternatively, the testing platform 102 may be located on and/or executed by a plurality of computing devices configured for performing distributed computing operations. Such a plurality of computing devices may be configured to communicate via network connections between the computing devices that make use of one or more communication networks (e.g., intranets, other private networks, the Internet, and/or other public networks).

Further, in some examples, the testing platform 102 is configured to communicate with user devices 104 via one or more communication networks (e.g., intranets, other private networks, the Internet, and/or other public networks). The user devices 104 may include computing devices, such as laptop computers, personal computers, tablets, mobile phones, and/or other portable computing devices. In some examples, the user devices 104 are configured to connect to multiple types of communication networks, such mobile phones or other computing devices configured to operate using connections to Wi-Fi networks and/or cellular networks.

In some examples, the user devices 104 include hardware, firmware, and/or software configured for collecting usage data 110, using a usage data collector 124, and providing the collected usage data 110 and configuration data 108 as user device data 106 to the testing platform 102. The user devices 104 are further configured to receive or otherwise obtain test instructions 126 from the testing platform 102, execute tests associated with the test instructions 126 using a test execution engine 128, and generating test results 130 based on those executed tests. The user devices 104 are configured to send or otherwise provide the test results 130 to the testing platform 102 as a result of the tests being executed. The user devices 104 may be configured to operate in different states or modes with respect to the testing platform 102, including an "active" state when a user is using the user device, an "idle" state when the user device is not being used, and a "testing" state when the user device is performing a test based on instructions received from the testing platform 102. Such state data may be provided to the testing platform 102 with the user device data 106, enabling the testing platform 102 to schedule tests on user devices 104 based on those states (e.g., sending a test that can be performed while the user device is idle when the user device 104 informs the testing platform 102 that it is in an "idle" state, refraining from sending tests to a user device that is currently in a "testing" state).

It should be understood that, while many of the examples herein describe the user devices 104 as mobile phones or other mobile computing devices, in other examples, the user devices 104 may be other types of devices (e.g., any consumer or industrial "Internet of Things" (JOT) devices or other devices that include a software agent and can communicate with a cloud network) without departing from the description. For instance, devices that are onboard in smart vehicles, or devices that are integrated into smart home systems, may be used as user devices as described herein.

The configuration data 108 of the user devices 104 includes data that indicates hardware, firmware, and/or software details associated with the configuration and state of the associated user device 104. In some examples, the configuration data 108 includes hardware identifiers that indicate a type and/or version of processor of the user device 104, a type and/or version of wireless radio hardware of the user device 104, and/or other type or version indicators of other hardware of the user device 104 (e.g., screen hardware, battery or other power-based hardware). Additionally, or alternatively, the configuration data 108 includes indicators of the types and/or versions of firmware and/or software installed on the user device 104. For instance, the configuration data 108 may include a type and/or version of operating system (OS) that is installed on the user device 104, types and/or versions of firmware interfaces installed on the user device 104 which enable the OS to interact with hardware of the user device 104, and/or types and/or versions of applications or other software that are installed on the user device 104. In other examples, more, fewer, or different types of configuration data 108 may be included on user devices 104 and/or used by the testing platform 102 without departing from the description.

The usage data 110 of the user devices 104 includes data that indicates how the associated user device 104 is used. In some examples, usage data 110 includes application usage data that indicates when applications are used on the user device 104, for how long applications are used on the user device, and/or operations that are performed by applications on the user device. Additionally, or alternatively, the usage data 110 includes location data combined with timestamps that indicates where the user device 104 was at various times in the past (e.g., the user device 104 and/or the associated usage data collector 124 may be configured to collect global positioning system (GPS) data using a sensor the user device 104 and/or using locations of cellular towers to which the user device 104 connected to triangulate or otherwise estimate the location of the user device 104). Further, in some examples, the usage data 110 of a user device 104 includes network connection data that indicates when the user device 104 is connected to a network, how it is connected to a network (e.g., via Wi-Fi or cellular protocols), which devices the user device 104 connects to, or the like. Additionally, network connection data of the usage data 110 may include log data that has been generated by tracking processes of the user device 104 when forming network connections, such as log data that tracks network connection handoff processes between cellular towers (e.g., between a fifth generation (5G) network connection and another type of cellular network connection) or between a Wi-Fi network and a cellular network. In other examples, more, fewer, and/or different types of usage data 110 may be collected by the usage data collector 124 of the user devices 104 and used by the testing platform 102 without departing from the description.

In some examples, the user device 104 sends the user device data 106, including the configuration data 108 and usage data 110 to the testing platform 102 periodically during the operation of the testing platform 102. Additionally, or alternatively, the testing platform 102 may be configured to request user device data 106 from user devices 104 during its operation, and the user devices 104 may be configured to respond to such requests with the user device data 106 as described herein. Further, in some examples, the user device 104 is configured to initially send the configuration data 108 and usage data 110 to the testing platform 102 when first connecting to the testing platform 102 and then, during operation of the testing platform 102, sending updated usage data 110 to the testing platform 102 and not resending the configuration data 108, which is likely to remain static during the operation of the testing platform 102. However, if configuration data 108 of a user device 104 does change during operation of the testing platform 102, the user device 104 may be configured to send updated configuration data 108 to the testing platform 102 when it sends the next set of usage data 110.

In some examples, the testing platform 102 is configured to periodically request usage data 110 from user devices 104 and to request confirmation that the configuration data 108 stored by the testing platform 102 is up to date with the current configuration data 108 of the user devices 104. Such confirmation may be done in the form of a checksum comparison or through some other confirmation method. If the configuration data 108 stored on the testing platform 102 is confirmed to be up to date, the testing platform 102 is configured to proceed with operation as described herein. Alternatively, if the configuration data 108 stored on the testing platform 102 is found to be out of date, the testing platform 102 may be configured to request update configuration data 108 from the user device 104.

Additionally, the testing platform 102 and a user device 104 may be configured to operate according to a "polling" mode in which the user device periodically or occasionally requests tests from the testing platform 102 (e.g., when the user device 104 is idle and/or when the user device 104 has not performed a test within a recent time interval). Alternatively, the testing platform 102 and user devices 104 may be configured to operate according to a "push" mode in which the testing platform 102 is configured to push test instructions 126 to user devices 104 based on determining that those user devices 104 are compatible with the test to be run and without receiving a request for tests from the user devices 104.

Figure 2:
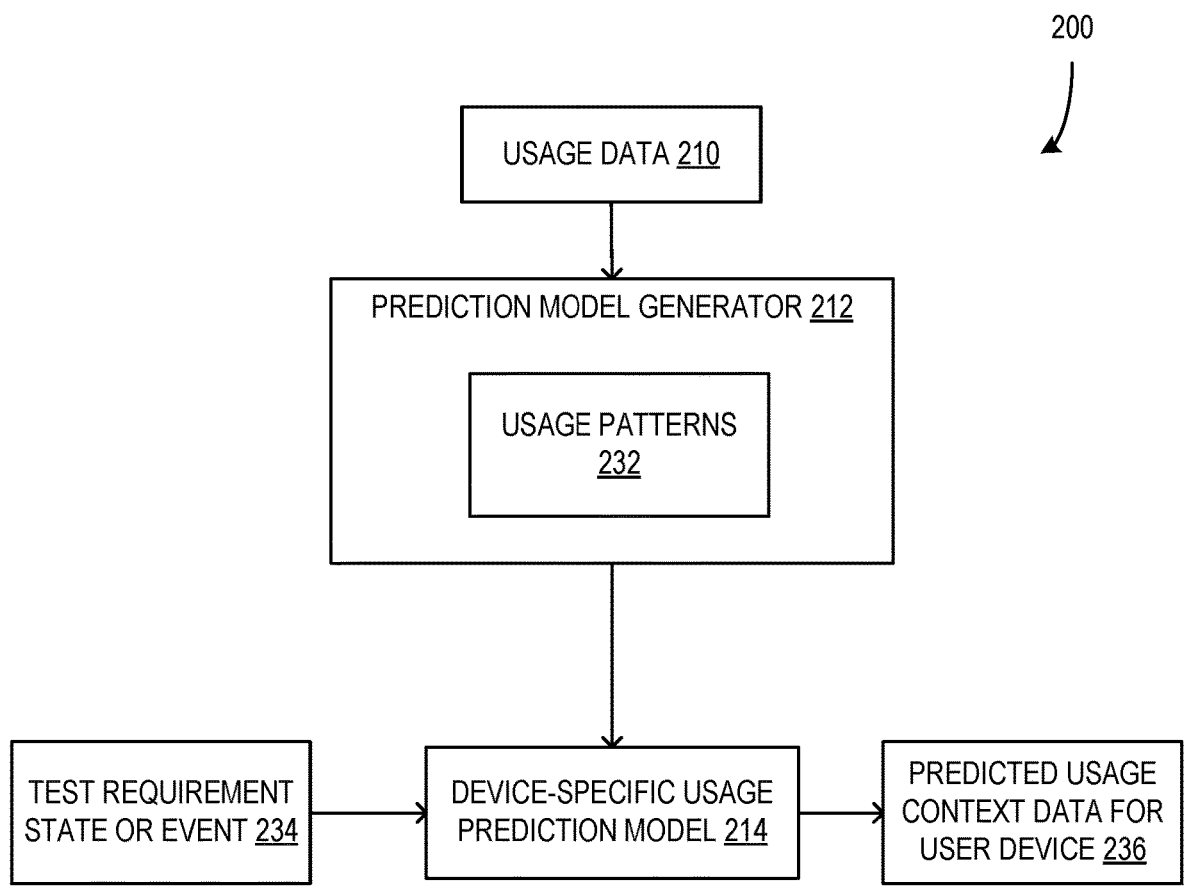
FIG. 2 is a block diagram illustrating generation and use of a usage prediction model according to an embodiment.

FIG. 2 is a block diagram 200 illustrating generation and use of a usage prediction model 214 according to an embodiment. In some examples, the components of the block diagram 200 are included in a system such as system 100 of FIG. 1. The usage data 210 of a user device (e.g., a user device 104) is provided to the prediction model generator 212 for generating the device-specific usage prediction model 214. The usage data 210 may include data as described above with respect to usage data 110 in FIG. 1. Additionally, in some examples, the usage data 210 includes time data indicating when events and/or device states described by the usage data 210 occurred on the associated user device (e.g., the time data may indicate a timestamp of when the user device established a network connection with a Wi-Fi network source or when and for how long a particular application was executed or run on the user device).

The prediction model generator 212 is configured to use the usage data 210 to determine a usage pattern or patterns 232 of the associated user device and those usage patterns 232 are then used to generate and/or train the device-specific usage prediction model 214. A usage pattern 232 may include data that indicates identified patterns in the user device behavior over time. In some examples, the usage patterns 232 describe patterns of activity of the user device with respect to periods of time, such as events per day, events per week, or events hour. For instance, a usage pattern 232 may describe that the associated user device establishes a network connection with a particular Wi-Fi network every weekday at or around 9 AM. In another example, a usage pattern 232 describes that the associated user device executes a particular application for an average of one hour every day. Such usage pattern examples are simple, but it should be understood that different and/or more complex usage patterns may be identified and used by the prediction model generator 212 (e.g., a pattern of a user device includes the user device traveling to a particular location every Monday, Wednesday, and Friday at or around 10 AM and, upon arriving at the location, a particular application is executed by the user device for an average of 45 minutes).

In some examples, the prediction model generator 212 is configured to identify such usage patterns 232 from the raw usage data 210, such as logs of the user device that track changes to network connections of the user device, operations performed by the user device, and/or changes in focus to or from different applications running on the user device. The prediction model generator 212 may further be configured to organize, arrange, or otherwise format the usage patterns 232 into data structures that are compatible with the process of training a usage prediction model 214 (e.g., transforming usage data 210 in a raw format into usage pattern data formatted as model training data).

In some examples, the prediction model generator 212 is configured to train the device-specific usage prediction model 214 using machine learning techniques. Such techniques may include training the usage prediction model 214 on the usage patterns 232, testing performance of the usage prediction model 214 by comparing its output to known usage data 210 and/or usage patterns 232, and adjusting the usage prediction model 214 based on results of the performance testing.

In some examples, the training of the device-specific usage prediction models 214 includes machine learning techniques that use, for instance, a trained regressor such as a random decision forest, a directed acyclic graph, a support vector machine, a convolutional neural network or other neural network, or another trained regressor. It should further be understood that the training of the models 214 may make use of training data pairs based on the usage data 210 when applying machine learning techniques and/or algorithms. Millions of training data pairs may be stored in a machine learning data structure of the testing platform 102. In some examples, a training data pair includes a timestamp-based usage data value paired with an interval adjustment value. The pairing of the two values demonstrates a relationship between the usage data value and the adjustment values that may be used during the machine learning techniques and/or algorithms.

When generated, in some examples, the device-specific usage prediction model 214 is configured to predict predicted usage context data 236, such as a likelihood that a user device will enter a particular device state or that a particular device event will occur on the user device. The predicted usage context data values 236 output by the usage prediction model 214 are based on a timeframe or interval in which the predicted device state or event will occur. For instance, a device event (e.g., the user device executing a specific application) and a time interval (e.g., within the next six hours or within the next three days) may be provided as input to the usage prediction model 214 and the output from the usage prediction model 214 may be a context data value indicating a likelihood that the device event will occur within the input time interval (e.g., an 85% likelihood that the specific application will be executed within the time interval). In some examples, the device events and/or states and the time interval in which they are predicted are based on test requirements (e.g., test requirements 120) of a test (e.g., tests 118) that may be performed on the user device. A test scheduler (e.g., test scheduler 122) may be configured to use a device-specific usage prediction model 214 to determine user devices to use in scheduling a test as described herein. In other examples, the device-specific usage prediction model 214 may be configured to indicate predicted behavior of the associated user device in other ways without departing from the description.

In alternative examples, the device-specific usage prediction models 214 may be generated and maintained on the individual user devices by leveraging tailed prediction models such as logistic regression or support vector machine learning techniques without departing from the description. In such examples, the usage context data values 236 from the models 214 may be obtained by the testing platform 102 by requesting them from the individual user devices.

Returning to FIG. 1, the testing platform 102 includes a test definition interface 116. In some examples, the test definition interface 116 includes hardware, firmware, and/or software configured to enable the creating, generating, and/or otherwise defining of tests 118. The test definition interface 116 may be configured to provide a user of the testing platform 102 or an associated system with a graphical user interface (GUI) or other type of user interface that enables the user to define a test 118, including the test requirements 120 of the test 118. For instance, a GUI of the test definition interface 116 may be configured to enable a user to define a user device state or event to be tested (or to otherwise trigger the test) and to define a timeframe or interval over which the test should be performed. As an example, a test may be defined by a user to be triggered when the user device changes network connections from a Wi-Fi network connection to a cellular network connection and an associated timeframe of one week is defined such that the test is executed at least once by the user device within one week of the test being initiated.

Other test requirements 120 may be defined for tests 118 via the test definition interface 116. In some examples, test requirements 120 of a test 118 includes configuration requirements of the user devices that are instructed to perform the tests. For instance, a test 118 may be defined to test only user devices with particular hardware, firmware, and/or software configurations (e.g., a test defined to test user devices that use a particular type and/or version of processor and/or a particular type and/or version of OS). Further, test requirements 120 may include other contextual requirements, such as a requirement that the user device performing the test be in a particular location and/or be operating at a particular time of day. Additionally, or alternatively, the test requirements 120 of a test 118 may include a quantity of user devices upon which the test must be executed (e.g., a test 118 requires that test results be collected from at least 100 different user devices) and/or a quantity of times the test must be executed (e.g., a test 118 requires that the test 118 be executed at least 100 times but may be executed on a single user device multiple times).

Tests 118 may further be defined to include types of data to be provided as test results 130 upon execution of the tests 118. For instance, the types of test results 130 may include data logs associated with the operation of a user device during the performance of the test and/or other collected user device data collected after the test performance is complete. Additionally, test results 130 may include data collected from prior to the performance of a test and equivalent data collected after the performance of the test, such that the two sets of collected data may be compared to determine the results of the test. As an example, a test for configured to test the performance of a user device when forming a cellular network connection in a particular location may be defined to collect log data of the user device that is associated with the formation of the cellular network connection that is to be tested. Such log data may include recorded events or operations of the user device during the time period that the connection is being formed and timestamps of those events or operations. Additionally, or alternatively, the log data may include detected errors that occurred on the user device during the time period that the connection is being formed. Further types of test result data may include data indicating connection quality and/or connection performance of the formed cellular network connection after the formation of the connection is complete.

In some examples, tests 118 include data that indicates test performance operations the user device is to perform in order to complete the tests 118. The test performance operations may include operations that the user device is predicted to perform during normal use (passive test performance operations) and/or test performance operations that the user device is instructed to perform outside of its normal use during the test (active test performance operations). For instance, if a test 118 is testing a process of switching from executing a first application to executing a second application, the test may include a passive test performance operation that defines the operations necessary to switch between the two applications, such that the test detects when the switch occurs during normal operation of the user device. Alternatively, or additionally, a test may include an active test performance operation that defines an operation to collect test result data that the user device is instructed to perform during the test, wherein the test result data collection operation would not otherwise be performed by the user device during normal operation. Tests 118 may include multiple test performance operations which may be all active operations, all passive operations, and/or a mixture of both active and passive operations. Additionally, definition of the test performance operations may include timing of the performance of the operations (e.g., an active test performance operation is defined to be performed after a passive test performance operation is detected on the user device) and/or dependence of the performance of the operations (e.g., if data collected by a first test performance operation meets a defined threshold, then a second test performance operation is performed). It should be understood that, in other examples, more, fewer, or different types of test performance operations may be included in a test 118 without departing from the description herein.

In some examples, a test 118 is configured to test an unreleased version of an application or an entirely new application. Such tests may be configured to include test performance operations for installing the new version of the application or the new application itself on the user device prior to performing other operations associated with the test. Such tests may also include test performance operations for reverting the user device to a previous state after the test is completed, such that the new application is uninstalled and/or the associated application is reverted to an older version.

Figure 3:
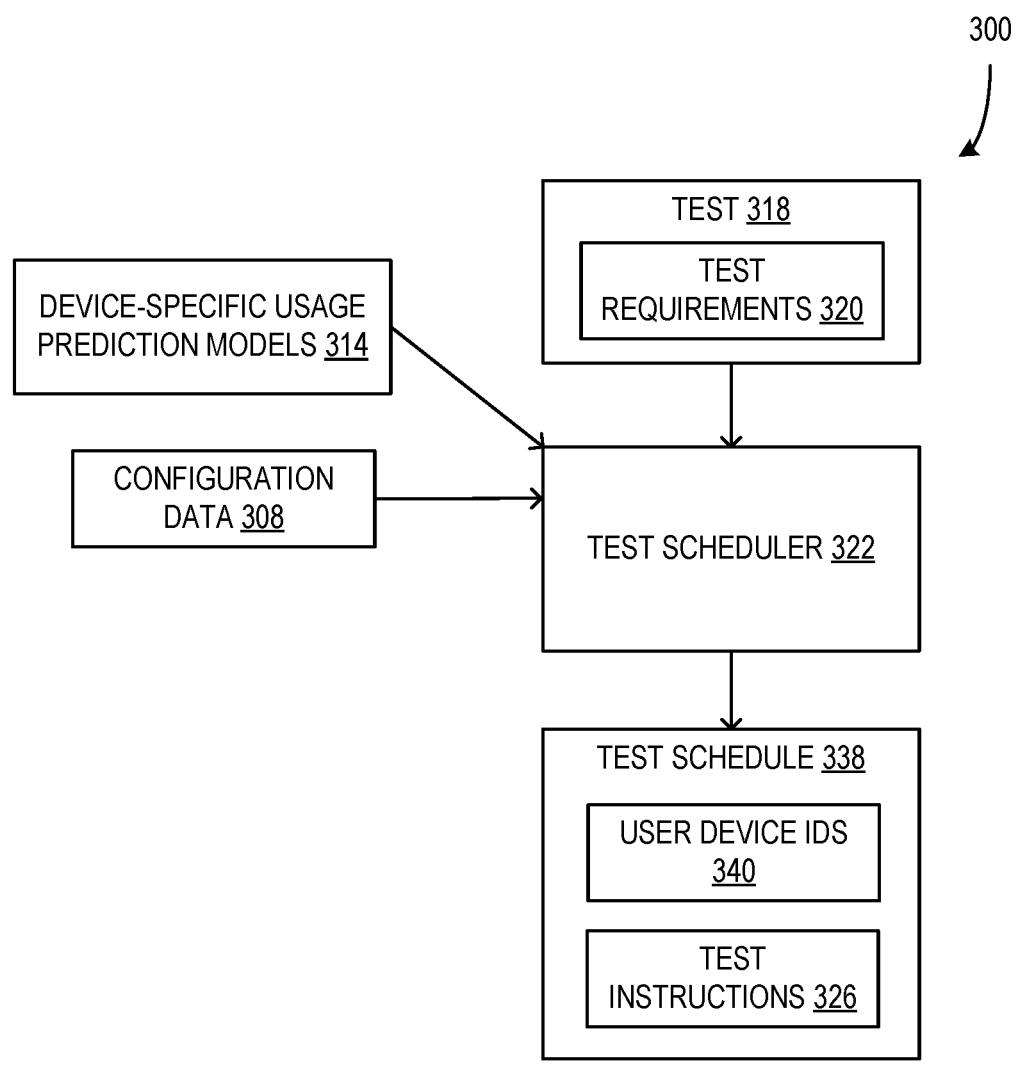
FIG. 3 is a block diagram illustrating scheduling of distributed performance of a test on multiple user devices according to an embodiment.

FIG. 3 is a block diagram 300 illustrating scheduling of distributed performance of a test 318 on multiple user devices according to an embodiment. In some examples, the elements of diagram 300 are integrated as part of a testing platform such as testing platform 102 of FIG. 1. The test 318, including test requirements 320 of the test 318, are provided to a test scheduler 322. Additionally, the test scheduler 322 is provided with configuration data 308 and device-specific usage prediction models 314 of a set of user devices (e.g., user devices 104) that may be used to perform tests. In some examples, the test scheduler 322 includes hardware, firmware, and/or software configured to analyze a test and the set of potential user devices to determine a subset of user devices to be used for performing the test and to schedule the test to be performed on the subset of user devices. The test requirements 320 may include requirements associated with the configuration of the user devices (e.g., based on the configuration data 308), requirements associated with the usage of the user devices (e.g., based on the usage prediction models 314), requirements associated with the time frame in which the test must be performed, and/or requirements associated with the quantity of user devices that must perform the test. The test scheduler 322 is configured to analyze the test requirements 320 of the test 318, including comparing the test requirements 320 to the configuration data 308 and output of the usage prediction models 314 (e.g., predicted context data values 236 for each user device) to identify the user devices that are most likely to be compatible with the test 318. A user device may be considered "compatible" with a test 318 if it its configuration data 308 matches any configuration requirements of the test 318 and/or if its predicted usage, based on the associated usage prediction model 314, indicates that it is likely satisfy any usage-based requirements of the test 318.

Identifying user devices that are compatible with a test 318 may include providing test requirement-based device states and/or device events to the usage prediction models 314 as described above with respect to FIG. 2. The output values of the usage prediction models 314 (e.g., predicted context data values 236) may be compared to a threshold generated by the test scheduler 322 to determine whether each associated user device is sufficiently likely to enter the required test state or to have the required test event occur thereon. For instance, the test scheduler 322 may set a threshold of 75% or greater for identifying compatible user devices. The usage-based requirements of the test are provided to usage prediction models 314 of the potential user devices and each model that outputs a likelihood value of 75% or greater indicates that the associated user device is compatible for the test based on the usage-based requirements.

The test scheduler 322 may be configured to determine a threshold to use with the usage prediction models 314 based on other requirements of the test 318. The test scheduler 322 may be configured with a default threshold (e.g., a default threshold of 80% likelihood that a user device is predicted to meet the usage requirements of a test) that may be adjusted to meet the other requirements of the test 318. For instance, if the default threshold is 80% and the test scheduler 322 initially identifies 90 user devices that are compatible with the test using that default threshold, but the test requires at least 100 user devices to perform the test, the test scheduler 322 may be configured to adjust the threshold down to identify additional user devices that may satisfy the test requirements. In such an example, if the first set of 90 identified user devices has an average likelihood value of 90%, the test scheduler 322 may determine that 81 of the identified user devices will complete the test (90 user devices*90%=81) and so, an additional 19 user devices must be identified. The test scheduler 322 may reduce the required threshold to 70% to identify additional compatible user devices. For instance, if 32 more user devices are identified based on the adjusted threshold and the average likelihood value of the set of 32 user devices is 75%, the test scheduler 322 may determine that 24 of the newly identified 32 user devices will complete the test (32 user devices*75%=24). This brings the total to 105, which satisfies the requirement for 100 user devices with an additional 5 user devices as a buffer. In some examples, the test scheduler 322 is configured to determine that the 5% buffer is sufficient and the identified set of user devices for performing the test is considered complete. Alternatively, the test scheduler 322 may be configured to require a larger buffer (e.g., a 10% buffer) to guard against the uncertainty that is inherent in the usage prediction models and, as a result of the insufficient buffer of 5%, the test scheduler 322 may be configured to reduce to the threshold again and identify a third set user devices with lower likelihood values. This process may repeat until a sufficient quantity of user devices is identified to satisfy the requirements of the test and any buffer requirements of the test scheduler 322.

In some examples, the test scheduler 322 is configured to generate a test schedule 338 based on its analysis of the test 318 and the data of the available user devices. When the test scheduler 322 identifies a set of user devices that each satisfy the device-based requirements of the test and that is large enough to satisfy device quantity-based requirements of the test, the test scheduler includes the identifiers, or IDs, of the identified user devices in the test schedule 338 as user device IDs 340. The user device IDs may include identifier data that uniquely identifies each user device and/or data that may be used by the test scheduler 322 to identify and/or communicate with each user device (e.g., a network address of each user device).

The test scheduler 322 is further configured to include test instructions 326 in the test schedule 338. In some examples, the test instructions 326 are generated from requirements and/or other data of the test 318 and are formatted in a manner that enables user devices to perform operations associated with the test 318 using the test instructions 326. The test instructions 326 may include instructions for collecting the test result data associated with the test 318 and/or performing operations on the user devices that are required for performance of the test (e.g., test performance operations as described above). Further, the test instructions 326 may include instructions associated with time-based requirements of the test (e.g., "all results must be sent back to the testing platform within five days") and/or instructions for reverting the user device state back to a state it was in prior to the performance of the test.

Based on the test schedule 388 being completed by the test scheduler 322, the test scheduler 322 may be configured to send the determined test instructions 326 to the user devices identified in the user device IDs 340. In some examples, the sent test instructions 326 include test execution control signals or the like that instruct and/or otherwise cause the user devices to perform operations associated with the test to be executed.

Returning to FIG. 1, the test instructions 126 may be sent to the user device 104 from a test schedule 338 of the testing platform 102 as described above with respect to FIG. 3. Those test instructions 126 may be sent or otherwise provided to a plurality of the user devices 104 and they may cause each of the plurality of user devices 104 to perform operations associated with a test 118.

Upon receiving the test instructions 126, the user devices 104 may be configured to execute the test instructions 126 using the text execution engine 128, which, in turn, produces test results 130 during or after the test is complete. In some examples, the test execution engine 128 is a software agent that is installed on and/or executed on each of the user devices 104 that are potential targets for running tests from the test platform 102 as described herein. Such a software agent may be included on the user devices 104 and/or otherwise installed on the user devices 104. In some examples, the software agent is associated with the testing platform 102 and, on each client device 104, the software agent further includes the usage data collector 124 and modules, elements, or interfaces used to communicate with the testing platform 102, including sending user device data 1065, receiving test instructions 126 and sending test results 130 as described herein.

The test execution engine 128 may be configured to identify the occurrence of and/or cause the performance of test performance operations based on the test instructions 126. In some cases, the test instructions 126 include passive test performance operations that the user devices are likely to perform during normal operations. The test execution engine 128 may be configured to detect the performance of such passive operations and act based thereon (e.g., to collect test results 130, to trigger the performance of other test performance operations). Additionally, or alternatively, if the test instructions 126 include active test performance operations, the test execution engine 128 may be configured to force or otherwise cause the performance of those operations based on the test instructions 126. Further, the test execution engine 128 is configured collect test results 130 based on the received test instructions 126.

The collected test results 130 may include log data, usage data, location data, or the like, as described above. The test execution engine 128 may be configured to collect some types of test result data during the performance of testing operations (e.g., logging events and/or errors and associated timestamp data during testing operations) and/or after the completion of testing operations (e.g., collecting status data associated with a network connection of the user device after the user device has established a connection with a Wi-Fi network). Additionally, or alternatively, the test results 130 may indicate whether a test was successfully performed (e.g., testing operations were performed and the results reflect success based on the test definition), performed but with a negative result (e.g., testing operations were performed and the results reflect failure based on the test definition), or not performed (e.g., a required device state was never reached during the testing time interval). For instance, if a test being executed is configured to test the capability of an application on the user device to establish a network connection, a successful performance of the test may result from the user device running the application and that application successfully establishing a network connection. A test performance with a negative result may result from the user device running the application and the application failing to establish a network connection. Test results of the test may further indicate a failed test performance if, during the testing time interval, the application being tested is never executed, such that the test could not be performed. In other examples, more, fewer, or different types of test results may be collected by the test execution engine 128 without departing from the description.

In some examples, the user device 104 is configured to send test results 130 to the testing platform 102 (e.g., using a software agent associated with the testing platform 102 and installed on the user device 104) upon completion of a test or expiration of an associated testing interval. Test results 130 received by the testing platform 102 may be stored in a data store or other data structure and/or sent to other entities of the system 100. Further, test results 130 may be used by the testing platform 102 to update and/or otherwise adjust the behavior of associated device-specific usage prediction models 114 and/or of the prediction model generator 112 using machine learning techniques or the like. For instance, if, based on the test results 130 received from the user devices 104, the predicted context data values generated by the usage prediction models 114 are found to be inaccurate (e.g., fewer of the identified user devices 104 were able to perform the associated test in the testing interval than predicted), the testing platform 102 may be configured to adjust those usage prediction models 114 to account for those test results 130 (e.g., the platform 102 may use the test results 130 as training data to update the usage prediction models 114). Additionally, or alternatively, based on the detection of the inaccurate context data values from a group of usage prediction models 114, the testing platform 102 may be configured to adjust the prediction model generator 112 itself, such that models generated and/or adjusted by the model generator 112 in the future are more likely to be accurate. Such adjustments to the model generator 112 may also be performed using machine learning techniques or the like without departing from the description.

Further, test results 130 may be used to review the performance of user devices 104 and associated software thereon (e.g., by users that have defined the tests being performed). Additionally, such test results 130 may be used to review the performance of other entities with which the set of user devices 104 interact during the testing intervals, such as reviewing the performance of one or more cellular network towers based on the tests performed on user devices 104 that use those cellular network towers. The test results 130 may be used for more, fewer, or different purposes without departing from the description.

Figure 4:
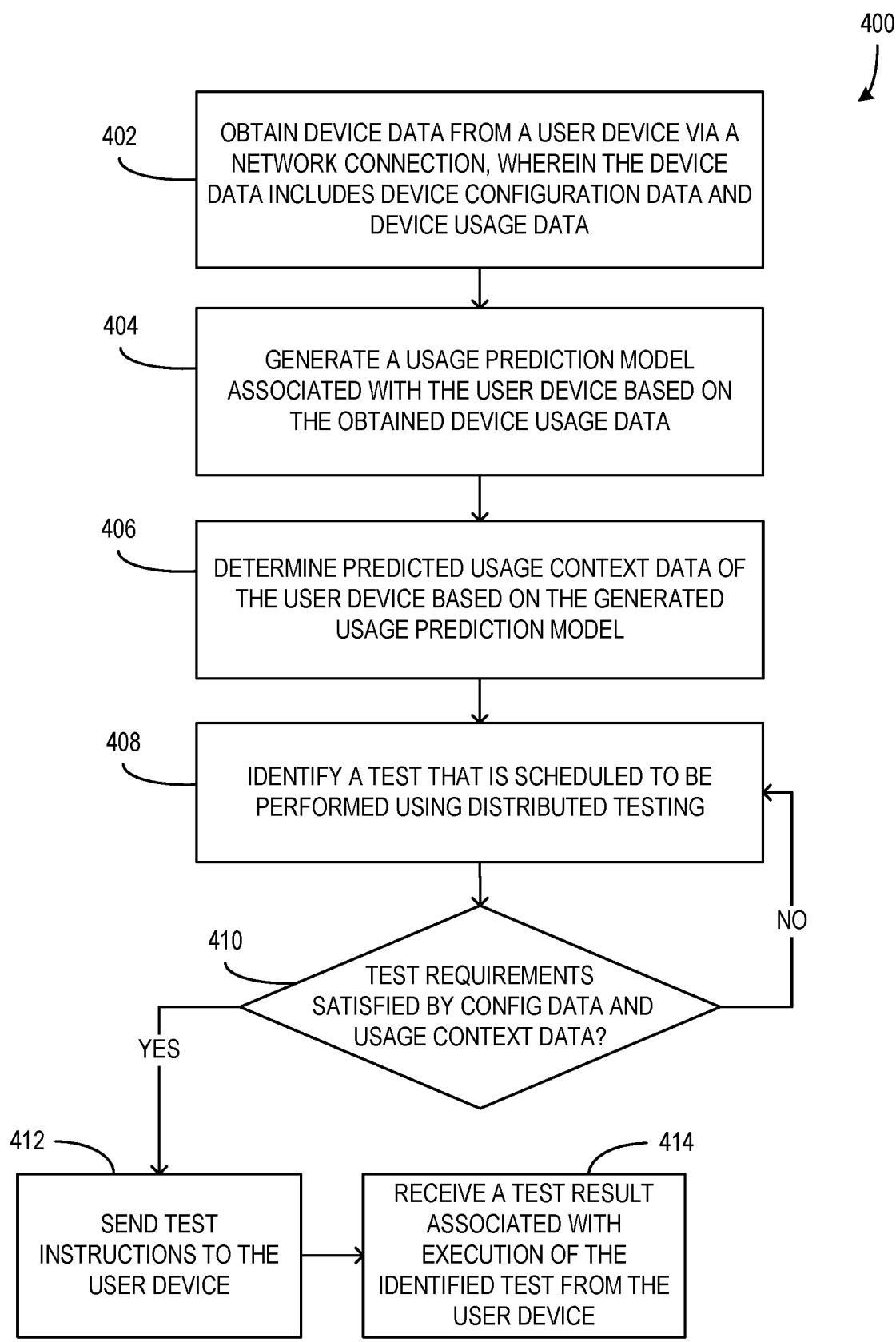
FIG. 4 is a flowchart illustrating a process of intelligently managing distributed testing using a usage prediction model of a user device according to an embodiment.

FIG. 4 is a flowchart illustrating a process 400 of intelligently managing distributed testing using a usage prediction model of a user device according to an embodiment. In some examples, the process 400 is performed by a testing platform such as testing platform 102 of FIG. 1. At 402, device data (e.g., user device data 106) is obtained from a user device (e.g., user device 104) via network connection, wherein the device data includes device configuration data (e.g., configuration data 108) and device usage data (e.g., usage data 110). In some examples, the device data is obtained as a result of a request sent by the testing platform to the user device. Alternatively, or additionally, the user device may send the device data to the testing platform independently of any request from the testing platform. For instance, the user device may send sets of device data to the testing platform periodically and/or based on detecting the occurrence of defined events.

At 404, a usage prediction model (e.g., device-specific usage prediction model 114) associated with the user device is generated based on the obtained device usage data. In some examples, the usage prediction model is generated from the device usage data using machine learning techniques, such that the model is trained based on the device usage data, which is used as training data. At 406, predicted usage context data (e.g., predicted usage context data 236) of the user device is determined based on the generated usage prediction model. In some examples, the predicted usage context data includes likelihood data values that indicate a predicted likelihood that the user device will enter a particular device state or perform a particular operation. Further, the predicted usage context data may include predicted location data indicating predicted likelihood that the user device will be in a particular location or locations in a particular time interval. Such context data may be generated from the model based on input provided to the model (e.g., input defining device events or device states such as test requirement states or events 234) as described herein.

In some examples, after the usage prediction model is generated, additional device usage data is obtained from the user device and the existing usage prediction model is updated based on the additional device usage data. The updating of the usage prediction model may include training the usage prediction model using machine learning techniques and using the additional device usage data as training data.

At 408, a test (e.g., tests 118) is identified that is scheduled to be performed using distributed testing. In some examples, the test is identified from a plurality of pending tests that are to be executed or otherwise performed. If, at 410, the test requirements of the identified test are satisfied by the configuration data and the predicted usage context data of the user device, the process proceeds to 412. Alternatively, if the test requirements of the identified test are not satisfied by the configuration data and the predicted usage context data, the process may return to 408 to identify a different test that may be satisfied by the user device.

At 412, test instructions associated with the identified test are sent to the user device and, after sending the test instructions, at 414, test results associated with the execution of the identified test are received from the user device. In some examples, the test instructions are configured to cause the user device to record or collect certain types of data during the performance of the test. Additionally, the test instructions may be configured to cause the user device to perform defined operations during the performance of the test. The test instructions may also be configured to cause the user device to detect events and/or device states associated with performance of the test (e.g., a test instruction may be configured to cause the user device to detect when it is in a defined location and, based on detecting it, another test instruction may be configured to cause the user device to perform an operation associated with the test). For instance, the test instructions may include test instructions configured to cause the user device to collect log data during a transition between a Wi-Fi network connection and a 5G cellular network connection and wherein the test result includes the collected log data.

Further, the test results received from the user device may be stored by the testing platform and/or provided to other entities in communication with the testing platform. Additionally, the test results may be used to train entities within the testing platform, such as the usage prediction model of the user device, using machine learning techniques, as described herein.

Figure 5:
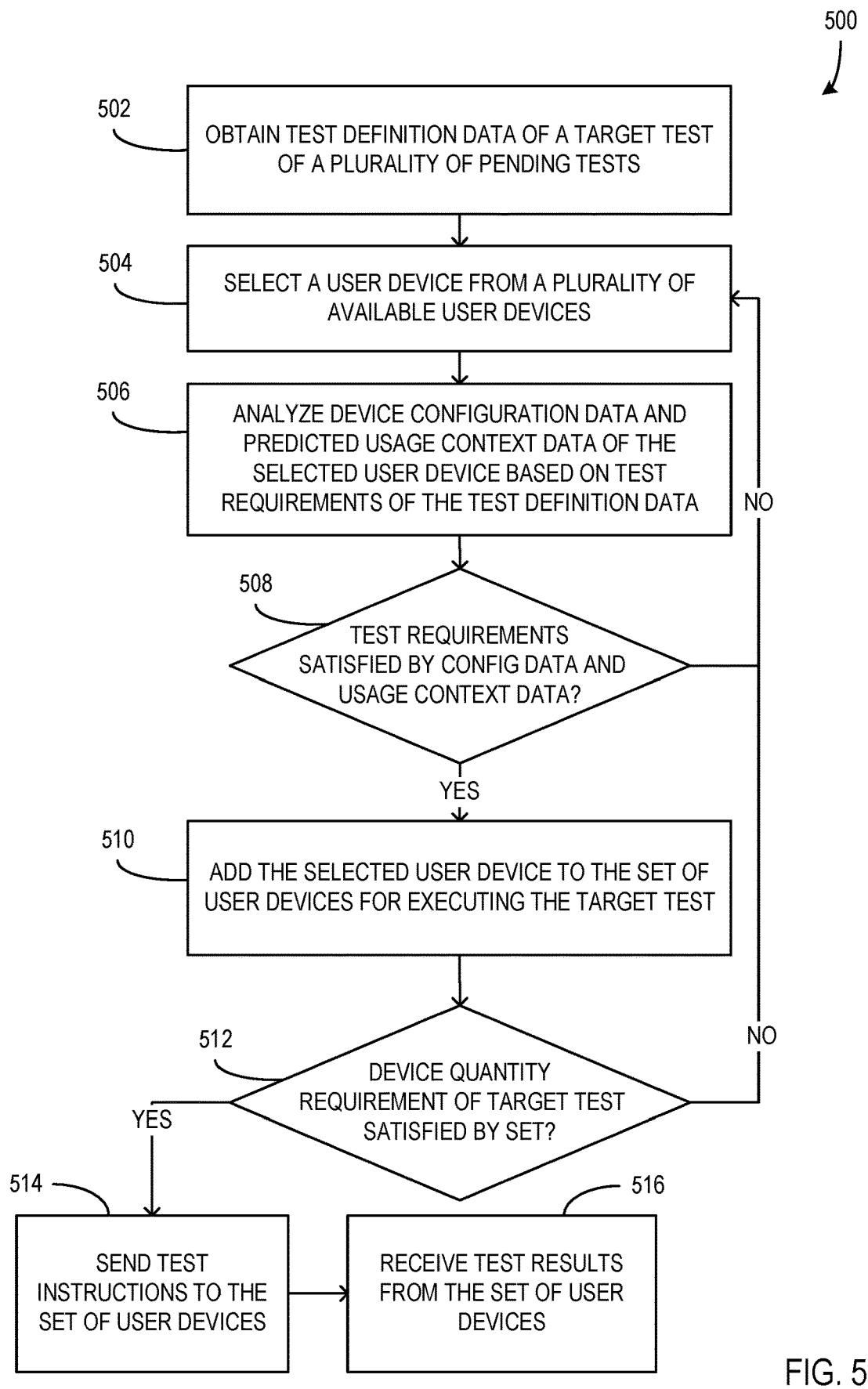
FIG. 5 is a flowchart illustrating a process of intelligently managing distributed testing using a set of user devices that satisfy test requirements according to an embodiment.

FIG. 5 is a flowchart illustrating a process 500 of intelligently managing distributed testing using a set of user devices that satisfy test requirements according to an embodiment. In some examples, the process 500 is executed or otherwise performed by or on a testing platform such as testing platform 102 of FIG. 1 as described herein. At 502, test definition data of a target test is obtained from a plurality of pending tests. In some examples, the plurality of pending tests (e.g., tests 118) are configured to be performed by a distributed set of user devices automatically, with no or minimal interaction by the users of the user devices. The target test may be selected from the plurality of pending tests based on a test order or test priority used to organize the plurality of pending tests. For instance, the pending tests may be organized based on the order of the tests being added to the pending test queue or other data structure (e.g., the pending test that was added to the data structure first is selected before the pending test that was added to the data structure second). Additionally, or alternatively, the selection of the target test from the plurality of pending tests may be based on other factors, such as a priority value assigned to the test in its test definition data (e.g., a test with a high assigned priority value may be performed prior to a test with a relatively lower assigned priority value). Further, the selection of the target test from the plurality of pending tests may be based on time-based requirements of the tests, such as deadlines for completion of the tests (e.g., a test with a target deadline that is sooner is selected prior to a test with a target deadline that is relatively later).

The test definition data may include test requirement data (e.g., test requirements 120 and/or a device quantity requirement) and/or other data that may be used to generate test instructions for sending to the user devices as described herein. In some examples, test requirements of the target test include at least one of the following: a configuration requirement requiring user devices to have a defined hardware component, a configuration requirement requiring user devices to have a defined software application, and a configuration requirement requiring user devices to have a defined version of a software application. The test requirements further include at least one of the following: a usage requirement requiring user devices to enter a defined device state, a usage requirement requiring a defined device event to occur on the user devices, and a usage requirement requiring user devices to perform a defined operation.

At 504, a user device from a plurality of available user devices and, at 506, the device configuration data and predicted usage context data of the selected user device is analyzed based on the test requirements of the test definition data. If, at 508, the test requirements are satisfied by the configuration data and/or the predicted usage context data, the process proceeds to 510. Alternatively, if the test requirements are not satisfied by the configuration data and/or the predicted usage context data, the process returns to 504 to select another user device from the plurality of available user devices.

In some examples, the test requirements include a required device state and/or event and the predicted usage context data includes likelihood values that indicate predicted likelihoods that the associated user device will enter the required device state and/or that the required device event will occur on thereon. In such examples, the test requirements may be satisfied based on the likelihood values of the user device exceeding a defined likelihood threshold. The defined threshold may be based on settings or configuration of the testing platform and/or it may be specific to the target test (e.g., the threshold may be defined as a requirement for the target test).

At 510, the selected user device is added to the set of user devices that will be used to execute the target test. At 512, if the device quantity requirement of the target test is satisfied by the current set of user devices, the process proceeds to 514. Alternatively, if the device quantity requirement of the target test is not satisfied by the current set of user devices, the process returns to 504 to select another user device from the plurality of available user devices.

In some examples, determining whether the device quantity requirement of the target test is satisfied is based on the quantity of user devices assigned to the set of user devices as well as the likelihood values of those user devices in the set. In such examples, an average likelihood value of the user devices in the set may be used to estimate an "effective quantity" of the user devices that are able to perform the test during the test interval and that estimate may be compared to the device quantity requirement to evaluate whether it is satisfied. For instance, if the device quantity requirement is 100 user devices and the set includes 120 user devices with an average likelihood value of 80%, the effective quantity of user devices in the set may be calculated as 96 user devices (120*80%), which does not satisfy the device quantity requirement of 100. If an additional five user devices are added to the set and the average likelihood value remains 80%, the effective quantity of user devices in the set becomes 100 user devices (125*80%), which satisfies the device quantity requirement. In further examples, more user devices may be added to the set to form a buffer of user devices, making it even more likely that the device quantity requirement of the test is satisfied when performed by the set of user devices. Such additions to the set of user devices may be the result of reducing the required likelihood threshold during analysis of the predicted usage context values of the user devices, expanding the set of available user devices that are compatible with the test requirements. Lowering the threshold may cause the average likelihood value of the set of user devices to also fall, but this may be offset by adding enough of the user devices to the set.

At 514, test instructions associated with the target test are sent to the set of user devices. In some examples, the sent test instructions include test execution control signals that are configured to cause the set of user devices to automatically execute the test. At 516, after sending the test instructions, test results associated with the target test are received from the set of user devices. The received test results may be stored and/or used by or on the testing platform as described herein.

In some examples, upon receiving some or all of the test results, if the quantity of test results received indicates that the device quantity requirement of the test is not satisfied (e.g., more devices than expected respond with feedback indicating that the test was not conducted), additional user devices may be identified as described herein and a second set of test instructions may be sent to those additional user devices. More generally, multiple sets of user devices may be identified, and test instructions sent until the end of the associated test interval and/or until the device quantity requirement of the test is satisfied.

Exemplary Operating Environment

Figure 6:
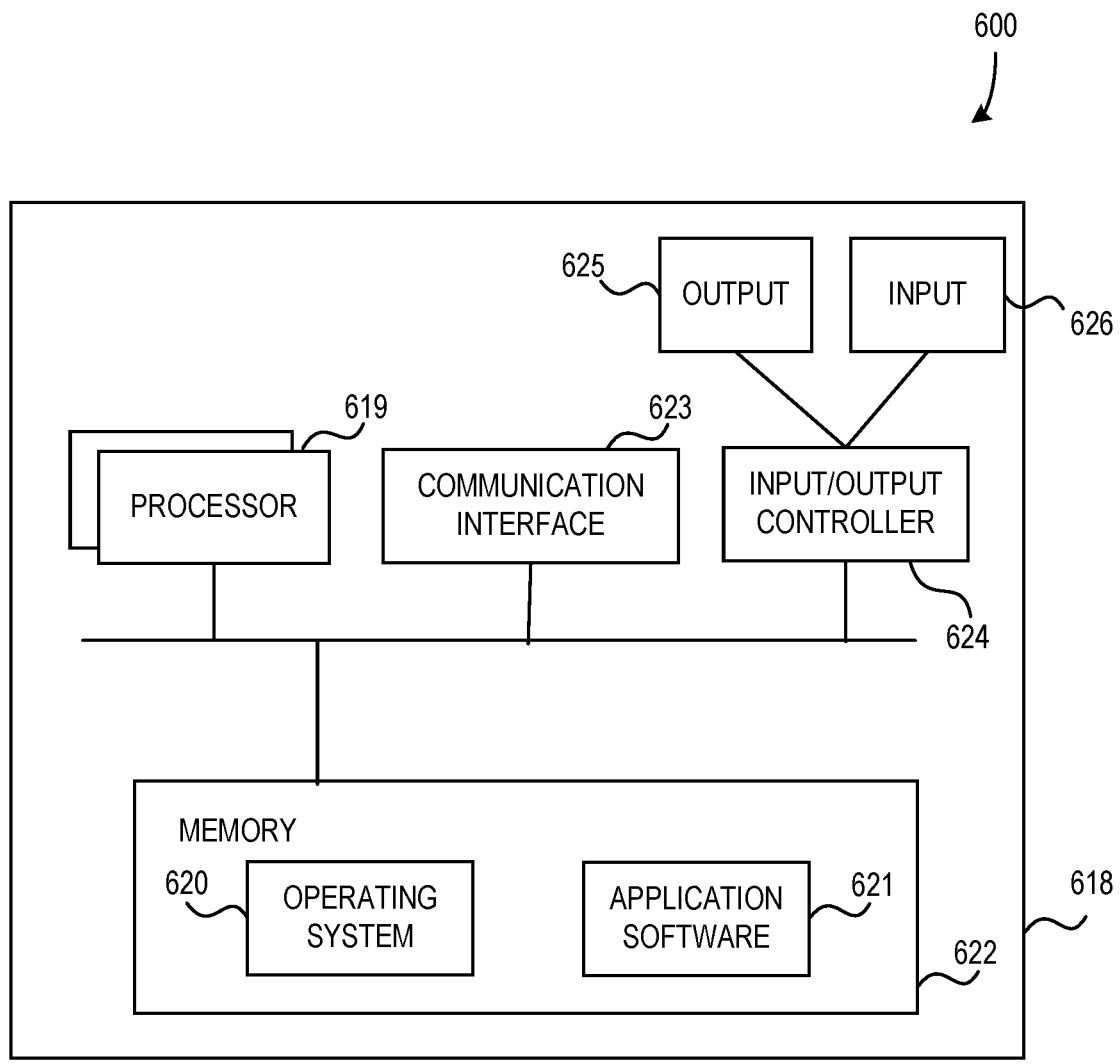
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, intelligently managing distributed testing by automatically scheduling tests on user devices as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g., using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 may also act as the input device. An example of such a device may be a touch sensitive display. The input/output controller 624 may also output data to devices other than the output device, e.g., a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for intelligently managing distributed testing comprises: a processor of a testing platform; and a non-transitory computer readable medium having stored thereon program code for transferring data to another computer system, the program code causing the processor to: obtain test definition data of a target test of a plurality of pending tests, wherein the plurality of pending tests are configured for distributed execution; identify a set of user devices for executing the target test from a plurality of available user devices, wherein a quantity of user devices in the set satisfies a device quantity requirement of the test definition data, wherein the identifying includes, for each user device of the plurality of available user devices: analyzing device configuration data and predicted usage context data of the user device based on test requirements of the test definition data; and based on the analyzing indicating that the device configuration data and the predicted usage context data satisfy the test requirements of the test, add the user device to the set of user devices; send test execution control signals to each user device of the set of user devices, wherein the test execution control signals are configured to cause the set of user devices to automatically execute the test; and receive test results associated with execution of the test from the set of user devices.

An example computerized method for intelligently managing distributed testing comprises: obtaining, by a processor of a testing platform, device data from a user device via a network connection, wherein the device data includes device configuration data and device usage data; generating, by the processor, a usage prediction model associated with the user device based on the obtained device usage data; determining, by the processor, predicted usage context data of the user device based on the generated usage prediction model; identifying, by the processor, a test that is scheduled to be performed using distributed testing, wherein the test includes test requirements that are satisfied by the device configuration data and the predicted usage context data of the user device; based on identifying the test, sending, by the processor, test instructions associated with the identified test to the user device, wherein the test instructions are configured to cause the user device to automatically execute the identified test; and receiving, by the processor, a test result associated with execution of the identified test from the user device.

A non-transitory computer storage medium having stored thereon program code executable by a first computer system at a first site, the program code embodying a method that comprises: obtaining, by a testing platform, device data from a user device via a network connection, wherein the device data includes device configuration data and device usage data; generating a usage prediction model associated with the user device based on the obtained device usage data; determining predicted usage context data of the user device based on the generated usage prediction model; identifying a test that is scheduled to be performed using distributed testing, wherein the test includes test requirements that are satisfied by the device configuration data and the predicted usage context data of the user device; based on identifying the test, sending test instructions associated with the identified test to the user device, wherein the test instructions are configured to cause the user device to automatically execute the identified test; and receiving a test result associated with execution of the identified test from the user device.

Alternatively, or in addition to the other examples described herein, examples include any combination of the following:
  further comprising: after generating the usage prediction model, obtaining, by the processor, updated device usage data from the user device via the network connection; and updating, by the processor, the generated usage prediction model based on the updated device usage data.
  wherein generating the usage prediction model and updating the generated usage prediction model includes training the usage prediction model using machine learning techniques, wherein the device usage data and updated device usage data are used as training data.
  further comprising updating, by the processor, the generated usage prediction model using machine learning techniques, wherein the received test result is used as training data.
  wherein the test instructions include at least one of the following: test instructions configured to cause collection of data based on operations being performed on the user device and test instructions configured to cause operations to be performed on the user device.
  wherein identifying the test is based on receiving a test request from the user device.
  wherein the test instructions include test instructions configured to cause the user device to collect log data during a transition between a Wi-Fi network connection and a 5G cellular network connection and wherein the test result includes the collected log data.
  wherein identifying the set of user devices such that the quantity of user devices in the identified set satisfies the device quantity requirement is further based on an average likelihood data value of the user devices in the identified set.
  wherein identifying the set of user devices further includes: identifying a first subset of user devices based on likelihood data values of the user devices of the first subset exceeding the defined likelihood threshold; determining the first subset of user devices fails to satisfy the device quantity requirement; based on the determining, reducing the defined likelihood threshold to a reduced likelihood threshold; and identifying a second subset of user devices based on likelihood data values of the user devices of the second subset exceeding the reduced likelihood threshold, wherein a combined set of the first subset of user devices and the second subset of user devices satisfies the device quantity requirement.
  wherein the test requirements include at least one of the following: a configuration requirement requiring user devices to have a defined hardware component, a configuration requirement requiring user devices to have a defined software application, and a configuration requirement requiring user devices to have a defined version of a software application; and wherein the test requirements include at least one of the following: a usage requirement requiring user devices to enter a defined device state, a usage requirement requiring a defined device event to occur on the user devices, and a usage requirement requiring user devices to perform a defined operation.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for obtaining, by a processor of a testing platform, device data from a user device via a network connection, wherein the device data includes device configuration data and device usage data; exemplary means for generating, by the processor, a usage prediction model associated with the user device based on the obtained device usage data; exemplary means for determining, by the processor, predicted usage context data of the user device based on the generated usage prediction model; exemplary means for identifying, by the processor, a test that is scheduled to be performed using distributed testing, wherein the test includes test requirements that are satisfied by the device configuration data and the predicted usage context data of the user device; based on identifying the test, exemplary means for sending, by the processor, test instructions associated with the identified test to the user device, wherein the test instructions are configured to cause the user device to automatically execute the identified test; and exemplary means for receiving, by the processor, a test result associated with execution of the identified test from the user device.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method comprising:
    obtaining, by a processor of a testing platform, test definition data of a target test, wherein the target test is configured for distributed execution;
    analyzing device configuration data and predicted usage context data of user devices in a set of user devices using test requirements of the test definition data;
    identifying, for each user device in a set of user devices, a likelihood that the user device will enter a required device state during a test interval of the target test;
    determining that an average likelihood data value for the set of user devices satisfies the test requirements;
    determining that a quantity of user devices in the set of user devices satisfies a device quantity requirement of the test definition data;
    sending test execution control signals to the set of user devices, wherein the test execution control signals instruct the set of user devices to automatically execute the target test; and
    receiving test results associated with execution of the target test from the user devices.

2. The computerized method of claim 1, further comprising:
    identifying a first subset of user devices, to include in the set of user devices, based on the likelihood of the predicted usage context data of the respective user devices of the first subset exceeding a defined likelihood threshold;
    determining that the first subset of user devices fails to satisfy the device quantity requirement;
    based on the determining, reducing the defined likelihood threshold to a reduced likelihood threshold; and
    identifying a second subset of user devices, to include in the set of user devices, based on the likelihood of the respective user devices of the second subset exceeding the reduced likelihood threshold, wherein a combined set of the first subset of user devices and the second subset of user devices satisfies the device quantity requirement.

3. The computerized method of claim 1, further comprising:
    obtaining, by the processor, device data from individual user devices via a network connection, wherein the device data includes device configuration data and device usage data; and
    generating, by the processor, an individual usage prediction model for each individual user device based on the obtained device data.

4. The computerized method of claim 3, further comprising:
    updating, by the processor, the individual usage prediction model for each individual user device using machine learning techniques, wherein the received test results are used as training data.

5. The computerized method of claim 1, wherein the test requirements include a configuration requirement requiring qualifying user devices to have a defined hardware component.

6. The computerized method of claim 1, wherein the test requirements include a configuration requirement requiring qualifying user devices to have a defined software application or a defined version of a software application.

7. The computerized method of claim 1, wherein the test requirements include a usage requirement requiring qualifying user devices to enter a defined device state during the test interval of the target test.

8. The computerized method of claim 1, wherein the test requirements include a usage requirement requiring a defined device event to occur on qualifying user devices during the test interval of the target test.

9. The computerized method of claim 1, wherein the test requirements include a usage requirement requiring qualifying user devices to perform a defined operation during the test interval of the target test.

10. A computer system comprising:
    a processor of a testing platform; and a non-transitory computer readable medium storing programming instructions, that upon execution by the processor, cause the computer system to perform the following operations:

obtaining test definition data of a target test, wherein the target test is configured for distributed execution;

analyzing device configuration data and predicted usage context data of user devices in a set of user devices using test requirements of the test definition data;

identifying, for each user device in a set of user devices, a likelihood that the user device will enter a required device state during a test interval of the target test;

determining that an average likelihood data value for the set of user devices satisfies the test requirements;

determining that a quantity of user devices in the set of user devices satisfies a device quantity requirement of the test definition data;

sending test execution control signals to the set of user devices, wherein the test execution control signals instruct the set of user devices to automatically execute the target test; and receiving test results associated with execution of the target test from the user devices.

11. The computer system of claim 10, wherein the test requirements include a configuration requirement requiring qualifying user devices to have a defined hardware component.

12. The computer system of claim 10, wherein the test requirements include a configuration requirement requiring qualifying user devices to have a defined software application or a defined version of a software application.

13. The computer system of claim 10, wherein the test requirements include a usage requirement requiring qualifying user devices to enter a defined device state during the test interval of the target test.

14. The computer system of claim 10, wherein the test requirements include a usage requirement requiring a defined device event to occur on qualifying user devices during the test interval of the target test.

15. The computer system of claim 10, wherein the test requirements include a usage requirement requiring qualifying user devices to perform a defined operation during the test interval of the target test.

16. A non-transitory computer storage medium storing programming instructions, that upon execution by a processor of a computer system, causes the computer system to perform the following operations:

obtaining test definition data of a target test, wherein the target test is configured for distributed execution;

analyzing device configuration data and predicted usage context data of user devices in a set of user devices using test requirements of the test definition data;

identifying, for each user device in a set of user devices, a likelihood that the user device will enter a required device state during a test interval of the target test;

determining that an average likelihood data value for the set of user devices satisfies the test requirements;

determining that a quantity of user devices in the set of user devices satisfies a device quantity requirement of the test definition data;

sending test execution control signals to the set of user devices, wherein the test execution control signals instruct the set of user devices to automatically execute the target test; and receiving test results associated with execution of the target test from the user devices.

17. The non-transitory computer storage medium of claim 16, wherein the test requirements include a configuration requirement requiring qualifying user devices to have a defined hardware component.

18. The non-transitory computer storage medium of claim 16, wherein the test requirements include a configuration requirement requiring qualifying user devices to have a defined software application or a defined version of a software application.

19. The non-transitory computer storage medium of claim 16, wherein the test requirements include a usage requirement requiring qualifying user devices to enter a defined device state during the test interval of the target test.

20. The non-transitory computer storage medium of claim 16, wherein the test requirements include a usage requirement requiring a defined device event to occur on qualifying user devices during the test interval of the target test.

* * * * *